(12) United States Patent
Higgs

(10) Patent No.: US 6,911,917 B2
(45) Date of Patent: Jun. 28, 2005

(54) HAZARD WARNING DEVICE, PARTICULARLY FOR HIGHWAY USE

(75) Inventor: James Robert Higgs, Kend (GB)

(73) Assignee: Astucia (UK) Limited, Kent (GB)

( * ) Notice: Subject to any disclaimer, the term of this patent is extended or adjusted under 35 U.S.C. 154(b) by 0 days.

(21) Appl. No.: 10/240,992

(22) PCT Filed: Mar. 27, 2001

(86) PCT No.: PCT/GB01/01321

§ 371 (c)(1), (2), (4) Date: Feb. 19, 2003

(87) PCT Pub. No.: WO01/76909

PCT Pub. Date: Oct. 18, 2001

(65) Prior Publication Data

US 2004/0021580 A1 Feb. 5, 2004

(30) Foreign Application Priority Data

Apr. 6, 2000 (GB) .............................................. 0008339

(51) Int. Cl.$^7$ .............................................. G08G 1/095
(52) U.S. Cl. ................ 340/908; 340/693.1; 340/815.45
(58) Field of Search ............................. 340/908, 908.1, 340/815.4, 815.45, 693.1, 473, 321

(56) References Cited

U.S. PATENT DOCUMENTS

| 4,613,847 A | 9/1986 | Scolari et al. |
| 4,751,622 A | * 6/1988 | Williams ..................... 362/183 |
| 4,827,245 A | * 5/1989 | Lipman ...................... 340/321 |
| 4,952,910 A | 8/1990 | Straten et al. |
| 5,521,595 A | * 5/1996 | Totten et al. ............... 340/908 |
| 5,627,513 A | * 5/1997 | Weed et al. ................. 340/473 |
| 5,754,124 A | 5/1998 | Daggett et al. |

FOREIGN PATENT DOCUMENTS

| DE | 3641908 A1 | 6/1988 |
| DE | 3831930 A1 | 3/1990 |
| JP | 08067203 A | 3/1996 |
| JP | 09279524 | 10/1997 |
| JP | 11158823 A | 6/1999 |
| JP | 20000230218 A | 8/2000 |
| WO | WO/01/76909 A1 | 10/2001 |

* cited by examiner

Primary Examiner—Thomas Mullen
(74) Attorney, Agent, or Firm—King & Schickli, PLLC

(57) ABSTRACT

A hazard warning device for highway use includes a set of self-contained, micro-processor controlled studs, each stud incorporating a rechargeable battery and/or capacitor, the studs being capable, when deployed and activated, of emitting a hazard warning light, and, when not deployed, housed in a charger case stored and transported in a road vehicle and rechargeable from the vehicle's electric system, each stud incorporating contact pins for recharging.

11 Claims, 4 Drawing Sheets

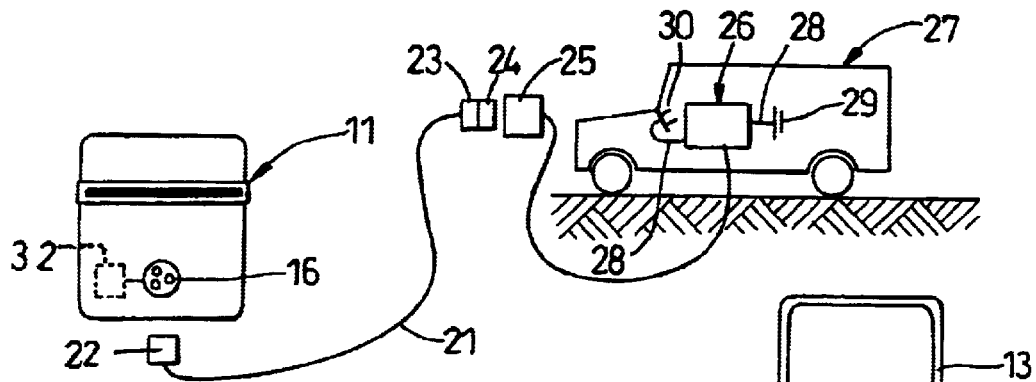
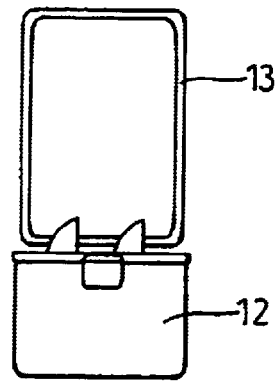
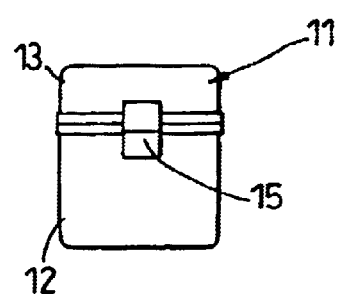
Fig. 8
Fig. 9
Fig. 11
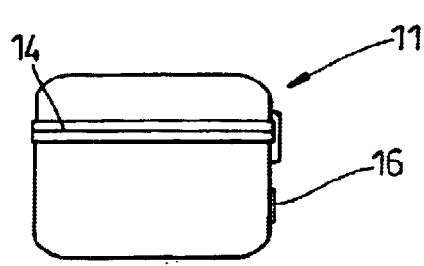
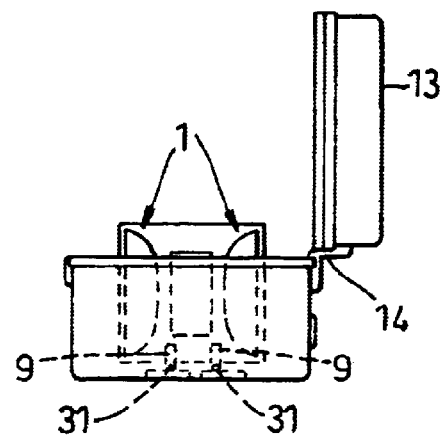
Fig. 10
Fig. 12

HAZARD WARNING DEVICE, PARTICULARLY FOR HIGHWAY USE

FIELD OF THE INVENTION

This invention relates to a hazard warning device particularly, but not exclusively, for deployment on a highway behind a broken-down or otherwise stationary vehicle or other static hazard.

BACKGROUND OF THE INVENTION

A road traffic requirement in several European countries is the carrying by motor vehicles of a warning triangle and its deployment, e.g. at 50–100 m, behind a broken-down or otherwise stationery vehicle. Such warning triangles carry reflective material and rely for their warning effect on illumination by the headlights of an on-coming vehicle, and hence constitutes in effect little more than a deployable reflective road stud using old technology.

In addition, it is also known to equip emergency motor vehicles with battery powered lighting units for deployment, e.g. at a road accident. However, such units are relatively bulky and consume valuable storage space of emergency vehicles. Also, the existing systems normally require the batteries to be replaced at regular intervals. Unfortunately, in practice, the life left in the batteries is only normally checked when the unit is about to be used, and vital minutes are lost replacing the batteries at what is usually the most dangerous period of the emergency.

Furthermore, when transporting known battery units from the emergency vehicle to the intended deployment location, due to their bulk and weight only two units can be normally carried by one person at any one time, usually resulting in the need to make repeated journeys, and frequently, emergency vehicles cannot be located in close proximity to the required deployment location.

OBJECT OF THE INVENTION

A basic object of the invention is the provision of an improved hazard warning device.

SUMMARY OF A FIRST ASPECT OF THE INVENTION

According to a first aspect of the invention, there is provided a hazard warning device, particularly for highway use, comprising a self-contained stud incorporating at least one rechargeable battery and/or capacitor to power, when deployed, at least one hazard warning light, and control circuitry to control inter alia activation of the light.

SUMMARY OF A SECOND ASPECT OF THE INVENTION

According to the present invention there is provided a hazard warning device comprising a set of self-contained, micro-processor controlled studs incorporating at least one rechargeable battery and/or capacitor, the studs being capable, when deployed and activated, of emitting a flashing or constant hazard warning light, and adapted, when not deployed, to be housed in a charger case that is stored and transported in a vehicle, with said battery and/or capacitor being recharged from the electrical system of the vehicle.

ADVANTAGE(S) OF THE INVENTION

The device in accordance with the second aspect of the invention is adapted to be stored in any motor vehicle—typically an emergency vehicle—so that, in an emergency situation, the set of studs may be deployed in such a way as to set out a protective shield of hazard warning lights around, or in the vicinity of a road traffic accident, broken-down vehicles or other static hazard. Such deployment can be achieved in a minimal amount of time to forewarn other road users of an approaching hazard.

With the device in accordance with the invention, the studs are on constant charge within the vehicle, thereby ensuring that the studs are ready for instantaneous use at any time day or night and totally eliminating the need for battery checking and/or replacement required by prior art systems, thereby reducing maintenance costs and avoiding any delay in deployment.

Using the device of the invention, e.g. a set of five studs, all the studs being of road stud size, can normally be placed into one or more pockets of a jacket e.g. of emergency personnel, not only allowing deployment to be carried out at speed and in one journey, but also freeing the hands of the personnel for other uses.

PREFERRED OR OPTIONAL FEATURES OF THE INVENTION

The stud comprises a housing of synthetic plastics material.

The housing is rectangular in plan.

The hazard warning light is emitted from one side only of the rectangular housing.

Two opposed sides of the stud are provided with light reflective material.

The light reflective material is a strip of so-called corner cube reflector.

The stud incorporates an LED to signal activation on and/or charging.

The stud incorporates a pair of electrical contacts for re-charging purposes.

The contacts consist of a pair of spaced-apart pins projecting from one side of the rectangular housing.

The stud has a planar base adapted for stable seating on a road surface etc.

The base is provided with a friction enhancing covering e.g. of neoprene rubber.

Each stud provides emergency illumination at one side only thereof to prevent vehicles travelling in the opposite direction on two-way roads from misunderstanding the direction to follow, when the studs are placed in the "fend-off" position.

The hazard warning light of each stud is three high intensity LED'S of "emergency" colours, e.g. blue or red.

Each stud is provided with a rechargeable battery, or battery pack and/or capacitor.

Each stud incorporates a switch means whereby the LED's are automatically switched on upon deposit of the stud on a road or other surface.

Each stud is provided with an upwardly directed, low intensity LED emitting red or white light so that when the emergency has passed, and hence collection of the units is required, the studs can be readily located at night from the non-flashing side by the upward facing LED, after which the studs are returned and placed into the case and the case detects the presence of the studs switching on the red LED to signal that charging is being effected.

The charger case is adapted to contain a set of typically five studs.

As the charger case is used for storage and charging of the studs, the charger case is provided with a lead that plugs into the rear of the case and into the electrical system of the vehicle, which could simply be via the conventionally provided cigar lighter socket of the vehicle.

Instead of contact charging, induction charging could be effected.

To deploy the device, two catches mounted on the front of the case are released which allows the lid to open. The studs can then be removed from the case and placed into the pocket(s) of the emergency personnel. When the required location is reached e.g. at a road accident, the studs are laid onto the road surface with the light emitting side facing the oncoming traffic in a fend-off pattern.

The capacity of each stud battery or pack is such that, once activated, the studs continue to flash for a period up to 24 hrs in a phase one flash mode (-typical normal operational use per incident is 4 hrs) and after 24 hrs the stud automatically switches to phase two flash mode which is a pulsed flash rate, the light output will then flash for a period of approximately 50 seconds, then switch off for five seconds, the off-time will increase over the next three days until the stud switches off completely. This mode is available should the incident become protracted and allows the stud to conserve power.

The device incorporates means to detect the presence, speed and location at night, on carriageways, of approaching vehicles, and means to give off an audible warning to personnel in the hazardous area that a vehicle is approaching and/or will pass very close. The detection means is capable of detecting vehicles up to 200 m away at night, which alerts the personnel in the hazardous area of the oncoming vehicle. The detection means has an additional feature, to emit an additional warning should a vehicle be approaching that has crossed, or is on, the hard shoulder line, to emit an additional audio and/or visual signal.

A radio transmitter is also contained within the charger case as means to detect removal of the studs for deployment, and to initiate activation of an RF signal, which in turn can communicate to e.g. a road side telephone system and/or motorway control centres and/or emergency services to indicate that a vehicle is a hazard. Clearly a roadside telephone system would have to be fitted with a receiver that communicated with the device of the invention and the telephone system.

With the addition of a radio transmitter with an adjustable range of approximately 500 m tuned to traffic news frequently, the device additionally incorporates means to send a digital signal that would interrupt music, etc. to alert the driver of an approaching hazard.

Many of today's vehicles are fitted with the type of radio equipment that is capable of being interrupted to receive traffic news, but for vehicles without this type of radio, a receiver can be mounted within the car to receive information being sent out from a warning device in accordance with the invention.

With the addition of higher-powered transmitters fitted to the charge case, a signal could be sent to a motorway central control, whereby the approximate location of the deployed studs could be determined and, if necessary alert emergency services as to the location of the hazard.

The studs incorporate solar panels if extended operation use is envisaged. The battery packs can then have a charge input during daylight operations.

The studs incorporate a light detector and means to switch the units off during daylight conditions.

With the addition of the RF/IR, the LED's of the studs can be switched on/off, strobe or change colour by remote means. This will allow emergency personnel to control the units away from the hazardous area.

The studs, once activated, could also send a signal off road to ITS companies, the information can then be conveyed to vehicles showing the location of the hazard.

The studs may also be arranged to provide a flashing output of differing colours, to allow a full spectrum of light to aid colour-blind persons.

To house three or more studs, the charger case may be an ABS vacuum formed box with aluminium trim; mild steel collar and hinges. A charger case to house two studs has a bradd piano hinge to aid the stability of lid opening.

In detail, on a 12V electrical system of a police car for instance, two plates may be mounted within the box, which represent the positive and negative terminals to which the studs connect. These are fixed to the base of the case by means of individual foam strips. The strips are separated to prevent water collecting in the base of the case that has been picked up from the road surface by the studs and causing the unit to short-circuit the terminals. Attached to the metal bars are spring contacts to allow a good contact to be maintained between the stud and strip when vibration is present. The case is fitted with a socket mounted on the rear of the case; this in turn is connected via a fly lead to a car lighter socket, which provides power to charge the set.

The fly lead can contain a voltage regulator to allow the unit to be connected to 24V supply as found on fire engines. Additionally, a solar panel can be affixed to this fly lead to allow charging to take place when a vehicle is not present. A mains adapter that has a 12V output can be attached to charge the studs.

A filter to prevent dc voltage from passing can be incorporated into the case and allow ac signals to be passed along the power wires of the vehicle and be received and acted on by circuitry of the device, which allows for the case to be controlled and manipulated from the dashboard of a vehicle with no extra wires running around the vehicle.

As indicated previously, so-called super capacitors or similar can be used instead of batteries to give the unit a longer life and wider temperature operating conditions.

An alternative method of charge is to use an induction coil fitted in the studs, which will allow the units to charge with no direct contacts. This would totally eliminate all possibility of vibration affecting the charge cycle and make the unit intrinsically safe.

The units have the ability to display the full light spectrum and therefore able to output the same light pattern as police roof mounted strobes if required. Manipulation of the colours and flash rate is controlled by the use of a microprocessor. To respond to the human eye a flash rate approaching 50 hz can be used if constant light is required. Clearly, a bi-direction stud could be provided, if required, to show LED outputs in two directions.

Communicating between the studs can be achieved using bespoke software and RF/IR communication. This allows the studs to be placed in any order on the ground and a strobe will always flow from one side of the road to the other. Even if shuffled, the units will re-synchronise to strobe from one side of the road to the other.

The number and type of LED's could vary from three multi-spectrum LED's to any number that would fit in the housing.

Upward mounted LED's can also be included to allow airborne vehicles to view the studs from the air. This will be a high-powered LED to cover the maximum viewing angle.

BRIEF DESCRIPTION OF THE DRAWINGS

In the accompanying drawings:

FIGS. 8–12 correspond to FIGS. 3–7 but show a charge container adapted to store, and charge, two studs.

DETAILED DESCRIPTION OF THE INVENTION

Figure 1:
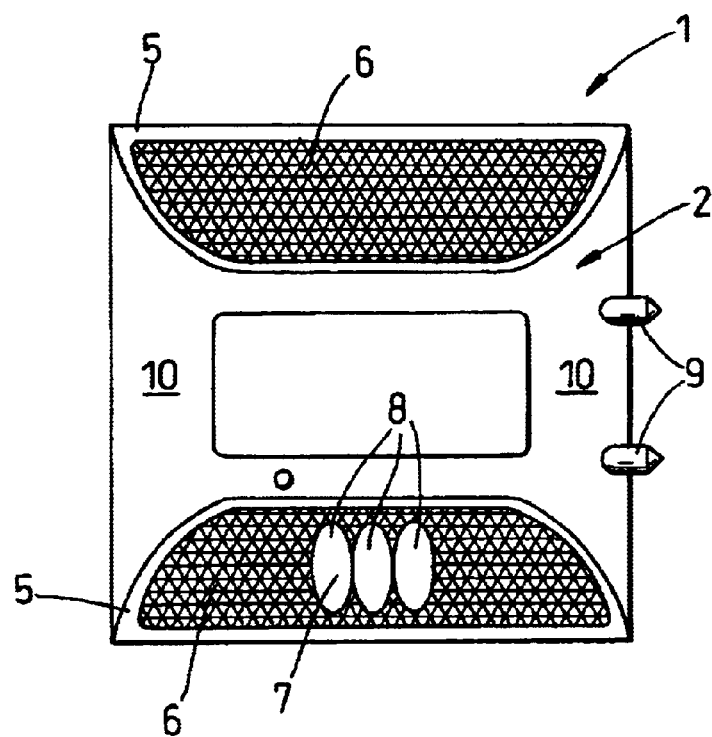
FIG. 1 is a plan view of a stud in accordance with the invention.
Figure 2:
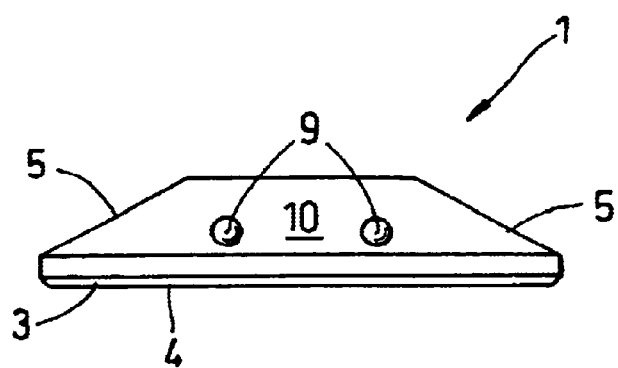
FIG. 2 is a side elevation of FIG. 1.
Figure 3:
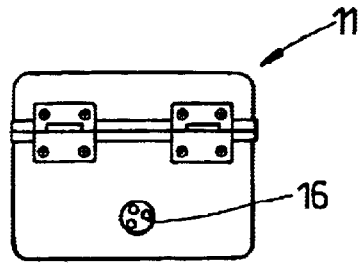
FIGS. 3–7 are various views of a charge container adapted to store, and charge three studs.
Figure 4:
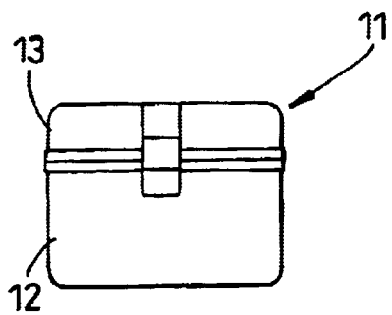
Figure 6:
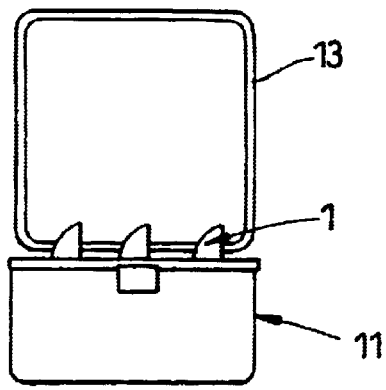
Figure 5:
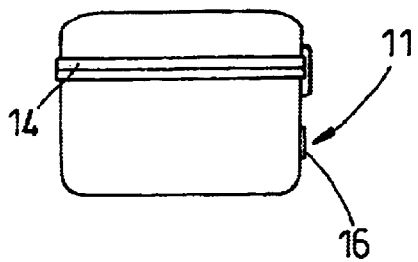
Figure 7:
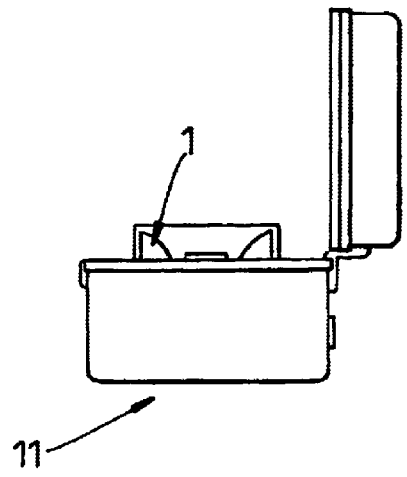

In the drawings, a stud 1 comprises a rectangular housing 2 of synthetic plastics material, having a planar base 3 provided with a neoprene rubber covering 4, the planar base 3 including switch means 33 whereby the LED's 8 are automatically switched on upon deposit of the stud 1 on a road or other surface (not shown).

The housing 2 defines two opposed sides 5, each provided with strips of corner cube reflective material 6, and one of the sides 5 provided with a hazard warning light 7, constituted by three LED's 8.

Figure 13:
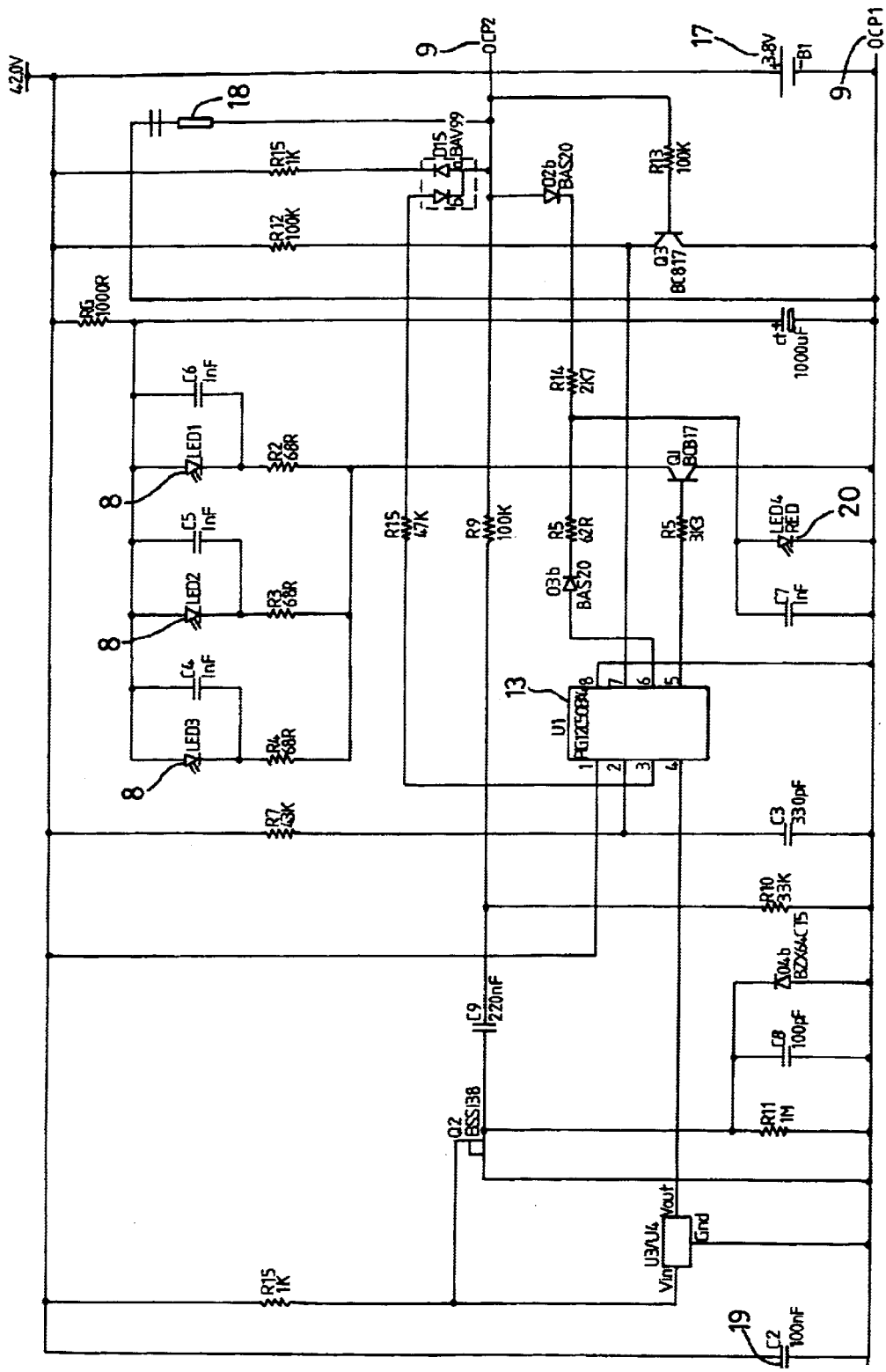
FIG. 13 is a schematic circuit diagram illustrating an embodiment of the present invention.

Internally, the housing 2 is provided with a battery 17, or battery pack (not shown) and/or with a capacitor (not shown), and also with electrical/electronic control circuitry of FIG. 13 and leads to two spaced-apart charger pins 9 projecting from one of the other opposed sides 10 of the housing 2.

A charger case 11 is adapted to be stored in a vehicle—typically an emergency vehicle such as a fire engine or police car—and adapted, in the embodiment of FIGS. 3 to 7 to house three studs 1, and in the embodiment of FIGS. 8 to 12, to house two studs 1.

The charger case 11 is provided with two pairs, or three pairs of plates (not shown) adapted to be engaged by the contact pins 9 when the studs 1 are fitted, end-on, into the charger case 11, as indicated in FIGS. 6, 7, 11 and 12.

A lead (not shown) is adapted to be plugged into a convenient power source e.g. the cigarette lighter socket, of a vehicle, to power, via suitable control circuitry, the pairs of plates.

The charger case 11 is moulded in synthetic plastics material and has a base 12, a lid 13 hinged to the base at 14, and a closure catch 15. A socket 16 is provided should a mains power source be available.

The components of the circuit of FIG. 13 are all industry standard components, whilst FIG. 13 also illustrates a microprocessor 13, a capacitor 19, a LED 20, as well as the three LED's 8, the two charger pins 9, the battery 17, and a light sensor 18, a signal from which light sensor 18 is detectable by the microprocessor 13, which serves as a means to switch off in daylight conditions.

Reverting to FIG. 8, a fly lead 21 is provided with a first end fitting 22 for plug and socket electrical connection to the socket 16, with a voltage regulator 23 and with a second end fitting 24 for plug and socket electrical connection to a standard vehicle electrical cigarette/cigar lighter socket 25 of an electrical circuit 26 of an emergency road vehicle 27, the circuit 26 being connected by power wires 28 to the vehicle battery 29 and to dashboard controls 30, with a DC filter 32.

The "in vehicle" charging position of one of the studs 1 is best illustrated in FIG. 12, where charger pins 9 engage plates 31 being positive and negative terminals.

What is claimed is:

1. A hazard warning device, comprising a set of self-contained, micro-processor controlled studs each incorporating at least one rechargeable battery and/or capacitor, said studs being capable, when activated by deployment, of emitting a flashing or constant hazard warning light, and adapted, when not deployed, to be housed in a charger case that is stored and transported in a road vehicle, with said battery and/or capacitor being recharged from the electrical system of said vehicle;

wherein each of said studs incorporates a pair of spaced-apart pins constituting electrical contacts projecting from one side of a rectangular housing for recharging purposes.

2. A hazard warning device as claimed in claim 1, wherein each of said studs comprises a rectangular housing of synthetic plastics material.

3. A hazard warning device as claimed in claim 1, wherein each of said studs incorporates at least one LED to indicate an activated or a charging state.

4. A hazard warning device as claimed in claim 3, wherein each of said studs incorporates a switch means whereby the or each of said LED's are automatically switched on upon deposit of said stud(s) on a road or other surface.

5. A hazard warning device as claimed in claim 3, wherein each of said studs incorporates a light detector and means to switch the or each of said LED's off during daylight conditions.

6. A hazard warning device as claimed in claim 1, wherein said charger case comprises a lid normally secured and closed by two catches mounted on the front of said charger case.

7. A hazard warning device as claimed in claim 1, wherein two plates are mounted within said charger case, which plates represent the positive and negative terminals to which the or each of said studs are electrically connectable.

8. A hazard warning device as claimed in claim 1, wherein a filter to prevent dc voltage from passing is incorporated into said charger case and allows ac signals to be passed along the power wires of the vehicle and be received and acted on by circuitry of said hazard warning device, which allows for said charger case to be controlled and manipulated from the dashboard of a vehicle.

9. A hazard warning device as claimed in claim 1, wherein said charger case is provided with a socket in a rear of said charger case, said socket being connectable via a fly lead to said electrical system of said vehicle, to provide power to charge said studs.

10. A hazard warning device as claimed in claim 9, wherein said fly lead contains a voltage regulator to allow connection to a road vehicle having a 24V supply.

11. A hazard warning device as claimed in claim 9, wherein said fly lead is connected to said electrical system via a vehicle cigarette lighter socket.

* * * * *